July 30, 1963 R. I. R. DEAN 3,099,155
TORQUE RECORDERS
Filed March 7, 1960
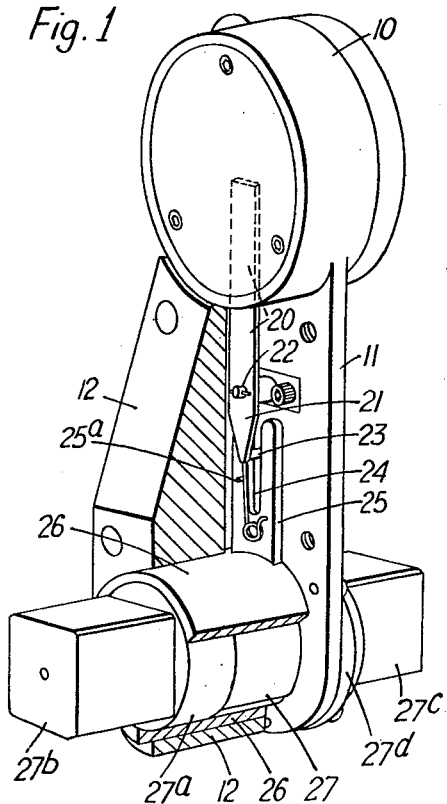
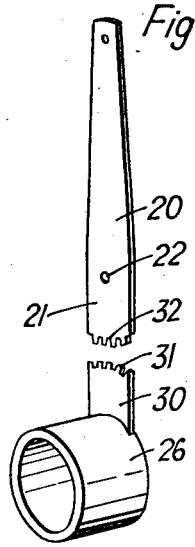
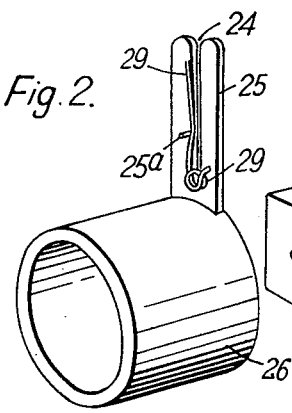
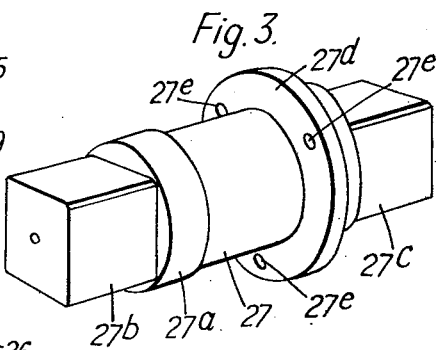
Inventor
REGINALD I. R. DEAN
By
Attorneys United States Patent Office 3,099,155
Patented July 30, 1963

3,099,155
TORQUE RECORDERS
Reginald I. R. Dean, 14–16 Curzon St., Derby, England
Filed Mar. 7, 1960, Ser. No. 13,289
1 Claim. (Cl. 73—134)

This invention relates to torque recorders for indicating torques or twisting moments on a dial or other gauge.

In existing instruments of this class there is a torque pin which is connected to the dial mechanism by a lever, and the torque is usually applied to the torque pin through the medium of a body part or housing in which the torque pin is fixed. For instance, the body part may have a handle for this purpose. The loading limits of these instruments are therefore determined by the rigidity of the torque pin mounting and the strength of the body part or housing.

The object of this invention is to remove these limitations by providing a form of torque recorder which is capable of withstanding very heavy loadings when required.

The present invention consists in a torque recorder having a housing which carries an indicating device operated by gearing from a lever connected to a torque pin, the torque pin projecting from the housing at each of its ends, so that one end can be held against rotation and the load applied to the other.

The torque pin is preferably connected to the indicating device through a lever system proportioned and designed to magnify the twisting of the torque pin at the indicator end of the lever system.

The lever system may have more than one component if desired.

A constructional form of the invention will now be described with reference to the accompanying drawings in which:

FIGURE 1 is a general perspective view of a torque recorder from the rear, with the back of the instrument partly broken away.

FIGURE 2 is a perspective view of a component by which the torque pin operates the mechanism.

FIGURE 3 is a perspective view of the torque pin itself.

FIGURE 4 is a perspective view illustrating an alternative arrangement.

The instrument comprises a housing 10 of cylindrical shape, the front of which carries the dial and indicator scale which is traversed by a pointer operated by gearing accommodated in the housing. A front plate 11 is attached to or formed integral with the housing and a rear member 12 is attached to the plate 11 and is recessed internally to receive the mechanism to be described. The member may be of any suitable shape.

The gearing which operates the pointer of the gauge dial is actuated by the long arm 20 of a lever which is pivotally mounted at 22 on the plate 11. The short arm 21 of the lever carries a pin 23 engaging in a slot 24 in a forked actuating member 25 responsive to the twisting of the torque pin. The member 25 is attached to a sleeve 26 which is shrunk on or otherwise rigidly attached to an outwardly flanged part 27ᵃ of the torque pin 27. The ends of the torque pin both project through the member 12 and are of squared shape as shown at 27ᵇ and 27ᶜ. The torque pin, including these two squared ends, one of which forms the driving end and the other the loading end, is a solid piece of high tensile steel, heat treated to withstand the loadings. It has a flanged extension 27ᵈ by which it is fastened to the front plate 11 by screws or pegs through holes 27ᵉ.

It will be seen that this torque pin can be designed to take very heavy loadings, but the remainder of the instrument is not affected, and by reason of the lever system the ratio of displacement imparted to the gauge mechanism can be greatly advantageous in giving clear readings of very small physical movements of the torque pin itself. The forked member 25 has a tension spring 29 attached to it bearing on a peg 25ᵃ on the fork and on the pin 23 of the short arm of the lever, so that this pin is held up against one side of the slot in the fork, and thereby ensures that there will be no lost motion.

An alternative arrangement is shown in FIGURE 4 where the sleeve 26 has attached to it an arm 30 having teeth 31 engaging with other teeth 32 on the short arm 21 of the lever to operate the lever like a rack.

It is not desired to restrict the invention to any particular arrangement of gearing for operating the pointer but preferably mechanism as described in the specification of my prior American Patent No. 2,977,801 is used.

The above described instrument according to the invention can be used as a torque spanner, or torque wrench as it is sometimes called, and can be designed in an extremely compact form, which is yet able to withstand very high loadings.

I claim:

In a torque indicating instrument, a mechanism for transmitting motion engendered by a torque force to an indicator comprising a tubular indicator housing, an elongated planar first support member extending from the tubular wall of said housing in a direction normal to the axis thereof and integrally secured to the housing wall, a second support member fixed to said first support member and extending opposite and parallel to said first support member, said second support member having a recess extending parallel to said first support member, openings in said first and second support members aligned with each other along an axis parallel to the axis of the tubular housing, a relatively short torque pin shorter than said planar support member and having a relatively large cross section mounted in said first and second support members and passing through said aligned openings, each end of the torque pin projecting from the support members, one end of said torque pin being secured to said first support member so as to be held against rotation while a load is applied to the other and freely twistable end, said torque pin being provided with an outwardly extending annular flange intermediate its ends and located within the opening in the second support member, a sleeve surrounding the torque pin for a distance greater than the width of said flange and rigidly attached to said flange and rotatable within the opening in said second support member for turning movement with the twistable free end of the torque pin, a forked member carried by the sleeve and extending parallel to the first support member within said recess in the second support member, said forked member having a slot spaced from the sleeve and extending in the direction of said indicator housing, an indicator lever pivotally mounted on one of said support members and having a short arm and a long arm, the long arm extending into said indicator housing for operation of said indicator, the short arm of the indicator lever having a pin engaging in said slot of the forked member whereby the forked member is enabled to move the lever in response to twisting of the free end of the torque pin.

References Cited in the file of this patent

UNITED STATES PATENTS

| | | |
|---|---|---|
| 2,219,632 | Naden | Oct. 29, 1940 |
| 2,497,756 | Billeter | Feb. 14, 1950 |
| 2,803,133 | Casady et al. | Aug. 20, 1957 |
| 2,934,946 | Engquist | May 3, 1960 |
| 3,011,332 | Skidmore | Dec. 5, 1961 |

FOREIGN PATENTS

| | | |
|---|---|---|
| 745,891 | Germany | Dec. 2, 1944 |